United States Patent
Bitzer et al.

(10) Patent No.: US 8,979,580 B2
(45) Date of Patent: Mar. 17, 2015

(54) FLUID-SEALING ELECTRIC MOTOR CONNECTOR AND MOTOR

(75) Inventors: Harold Bitzer, Buehl (DE); Katja Klingenfuss, Walzbachtal (DE)

(73) Assignee: Robert Bosch GmbH, Stuttgart (DE)

( * ) Notice: Subject to any disclaimer, the term of this patent is extended or adjusted under 35 U.S.C. 154(b) by 73 days.

(21) Appl. No.: 13/703,572

(22) PCT Filed: Apr. 14, 2011

(86) PCT No.: PCT/EP2011/055873
§ 371 (c)(1),
(2), (4) Date: Dec. 11, 2012

(87) PCT Pub. No.: WO2011/154181
PCT Pub. Date: Dec. 15, 2011

(65) Prior Publication Data
US 2013/0088106 A1    Apr. 11, 2013

(30) Foreign Application Priority Data
Jun. 11, 2010   (DE) .......................... 10 2010 029 982

(51) Int. Cl.
*H01R 13/73* (2006.01)
*H02B 1/01* (2006.01)
(Continued)

(52) U.S. Cl.
CPC .............. *H02K 5/10* (2013.01); *H01R 13/5202* (2013.01); *H01R 13/745* (2013.01); *H02K 5/225* (2013.01)
USPC ........................... 439/560; 439/271; 439/556

(58) Field of Classification Search
CPC ............... H01R 13/5219; H01R 13/74; H01R 13/5202; H01R 13/5208
USPC ......... 439/560, 271, 556, 545, 559, 587, 298, 439/370
See application file for complete search history.

(56) References Cited

U.S. PATENT DOCUMENTS 4,653,835 A * 3/1987 Schulte et al. ................ 439/557
4,676,575 A * 6/1987 Denlinger et al. ............ 439/271
(Continued)

FOREIGN PATENT DOCUMENTS

CN       1120749     4/1996
CN       1689197    10/2005
(Continued)

OTHER PUBLICATIONS

International Search Report for Application No. PCT/2011/055873 dated Jul. 14, 2011 (English Translation and Original, 6 pages).

*Primary Examiner* — Hae Moon Hyeon
(74) *Attorney, Agent, or Firm* — Michael Best & Friedrich LLP

(57) ABSTRACT

The invention relates to a fluid-sealing electric motor connector (1) for a housing (70) of an electric motor (7), in particular an electric motor (7) of an engine cooling fan or of an ABS/ESP system of a motor vehicle, comprising a connector housing (10), which can be attached to the housing (70) and by means of which at least one electrical line (80) can be connected to the electric motor so as to be fluid-sealed to the electric motor (7), wherein the connector housing (10) can be fastened to the housing (70) by means of a locking spring (50) or a catch mechanism, wherein the fluid-sealing electric motor connector (1) can be fastened to the housing (70) in an easily detachable manner. The invention further relates to a motor, in particular an electric motor (7) for an engine cooling fan or an ABS/ESP system of a motor vehicle, or a completed electrical cable (8) for a motor (7), in particular an electric motor (7), wherein the motor (7) or the completed electrical cable (8) has a fluid-sealing electric motor connector (1) according to the invention.

20 Claims, 7 Drawing Sheets

(51) Int. Cl.
*H02K 5/10* (2006.01)
*H01R 13/52* (2006.01)
*H01R 13/74* (2006.01)
*H02K 5/22* (2006.01)

(56) References Cited

U.S. PATENT DOCUMENTS

| | | | | |
|---|---|---|---|---|
| 4,851,725 | A | * | 7/1989 | Keck ................................ 310/71 |
| 5,631,445 | A | * | 5/1997 | Herster ........................ 174/151 |
| 5,775,944 | A | * | 7/1998 | Flask et al. ..................... 439/556 |
| 6,422,899 | B1 | * | 7/2002 | Miyazaki ..................... 439/559 |
| 6,821,160 | B2 | * | 11/2004 | Fink et al. ..................... 439/701 |
| 6,953,357 | B2 | * | 10/2005 | Fukushima et al. .......... 439/271 |
| 7,547,230 | B1 | | 6/2009 | Strausser et al. |
| 8,113,800 | B2 | | 2/2012 | Koitabashi et al. |
| 8,128,431 | B2 | * | 3/2012 | Kato et al. .................... 439/587 |
| 8,328,572 | B2 | * | 12/2012 | Tashiro ......................... 439/271 |
| 8,808,026 | B2 | * | 8/2014 | Yamaguchi et al. .......... 439/559 |
| 2006/0292913 | A1 | * | 12/2006 | Milton .......................... 439/271 |
| 2007/0184701 | A1 | * | 8/2007 | Yagome et al. ............... 439/271 |
| 2010/0009566 | A1 | * | 1/2010 | Sakakura et al. ............. 439/364 |
| 2012/0021632 | A1 | * | 1/2012 | Matsumoto et al. .......... 439/271 |

FOREIGN PATENT DOCUMENTS

| | | |
|---|---|---|
| CN | 101022193 | 8/2007 |
| CN | 101529669 | 9/2009 |
| DE | 102010029982 A1 * | 12/2011 |
| EP | 1659673 | 5/2006 |
| FR | 2906411 | 3/2008 |
| JP | 57003548 | 1/1982 |
| WO | WO 2011154181 A1 * | 12/2011 |

* cited by examiner and/or the fastening to the housing is intended to be easily detachable from the housing and without damaging a component of the sealing flange. Moreover, the connection is intended to be inexpensive and use fewer components than in the prior art. Furthermore, it is intended that less relatively cost-intensive sealing material has to be used for fluid-sealing the connection.
FLUID-SEALING ELECTRIC MOTOR CONNECTOR AND MOTOR

BACKGROUND OF THE INVENTION

The invention relates to a fluid-sealing electric motor connector for a housing of an electric motor, in particular an electric motor of an engine cooling fan or of an Antilock Braking System/Electronic Stability Program (ABS/ESP®) system of a motor vehicle. The invention further relates to a motor, in particular an electric motor for an engine cooling fan or of an ABS/ESP® system of a motor vehicle, or a ready-to-use electrical cable for such a motor.

For cost reasons, when producing electric motors, in particular direct current (DC) motors, deep-drawn parts are used for the housings thereof. In different applications, such as for example in engine cooling fans and/or in the ABS/ESP® area of motor vehicles, such electric motors have to be fluid-sealed, i.e. the electrical control and supply lines have to be inserted in a fluid-sealed manner via a sealing flange into the electric motor. FIG. 1 of the drawings shows such a sealing flange 100 according to the prior art, wherein the sealing flange 100 itself is fluid-sealed relative to the housing 70 via an axial seal 105 and one respective electrical line 80 via a radial seal 106.

The terminology used hereinafter for the seals is based upon the mechanical loading of the seal, i.e. a mechanically axially loaded seal is denoted as the axial seal and a mechanically radially loaded seal is denoted as the radial seal. The seals may, however, also be denoted according to the path of their sealing function, wherein the terms may be reversed, i.e. an axial seal is then denoted as the radial seal and a radial seal is denoted as the axial seal.

The sealing flange 100 according to the prior art is secured by means of self-tapping and/or self-cutting screws 102 to the housing 70, wherein the screws 102 have to be supported via steel sleeves 101 in order to prevent setting behavior of the sealing flange 100 which is produced from a relatively flexible plastics material. Moreover, the screws 102 are micro-encapsulated 103 in the region of their screw holes 104 in the housing 70, whereby said screws are also fluid-sealed relative to the housing 70. By means of the micro-encapsulation 103, the sealing flange 100 is only able to be removed again from the housing 70 by breaking open the micro-encapsulation 103; i.e. in the event of a repair, wherever possible the sealing flange 100 remains on the housing 70, as otherwise the micro-encapsulation 103 would have to be carried out again.

The screw connection required for the axial contact of the sealing flange 100 is complex and relatively cost-intensive, as additional screw holes 104 have to be provided and said screw holes have to be sealed by means of special screws 102. Moreover, the screwing process is relatively complicated, wherein micro-encapsulated screws 102 are expensive and the seal thereof (ca. 2000 ppm) is not always guaranteed in mass production. During the tapping process of the screws 102, shavings are produced which are able to penetrate the interior of the housing 70, which subsequently may cause damage during operation of the motor or to a printed circuit board which may lead to a breakdown of the entire motor. Moreover, the material consumption is increased by a screwing-on region of the sealing flange.

SUMMARY OF THE INVENTION

It is the object of the invention to specify an improved fluid-sealed connection, in particular an improved fluid-sealed electrical connection to a motor, in particular an electric motor. In this case, the connection is intended to be easier to handle than a conventional sealing flange, wherein the connection The object of the invention is achieved by means of a fluid-sealing electric motor connector for a housing of an electric motor, in particular an electric motor of an engine cooling fan or of an ABS/ESP system of a motor vehicle; and a motor, in particular an electric motor for an engine cooling fan or an ABS/ESP system of a motor vehicle, or a ready-to-use electrical cable for a motor, in particular an electric motor.

According to the invention, instead of a sealing flange for the electrical lines of the motor, which may only be removed in a complex manner from a housing of a motor, a connector for the lines is provided, said connector being able to be fastened in a simple and convenient manner to the housing and also being easily detachable from the housing. The fluid-sealing connector according to the invention has a plug connector housing which may be plugged onto the housing, by means of which at least one electrical line is able to be connected to the motor so as to be fluid-sealed relative thereto. The plug connector housing may be fastened to the housing by means of a locking spring or a latch mechanism, whereby the fluid-sealing connector may be fastened to the housing in an easily detachable manner.

The invention permits fewer and less expensive components to be used than in the prior art, wherein a more effective fluid-sealed connection is provided for the motor, with a smaller outlay for the mounting devices. In comparison with the prior art set forth in the introduction, at least two micro-encapsulated screws are dispensed with, resulting in the sealing problem in the screw region of the sealing flange being eliminated and shavings not being produced by the screws being screwed and/or cut into the housing. In a motor with a printed circuit board this is advantageous, in particular, when the printed circuit board has SMD (surface mounted device) components. At least two steel sleeves which have to be fitted into the sealing flange are also dispensed with.

In this case, the connector for fluid-sealing the relevant electrical line and/or the connector relative to the housing, may have a radial seal and an axial seal or a sealing unit preferably made in one piece from the same material, which ensures an axial and radial fluid-seal of the line and/or of the connector relative to the housing. The plug connector housing of the connector preferably has a mounting portion, by means of which the connector may be fastened to the housing of the motor. The mounting portion which is preferably substantially cuboidal is able in this case to be plugged inwardly into the housing, through a recess in the housing, and is configured such that the connector may be blocked inside the housing. Moreover, the mounting portion may be configured on the plug connector housing such that the connector may be blocked outside the housing.

In one embodiment of the invention, the mounting portion may have a locking recess, preferably formed as a through-recess, into which the locking spring may be inserted for mounting the connector on the housing such that a wall of the housing may be clamped between the locking spring and a shoulder of the plug connector housing. In this case, it is preferable if the locking spring has at least one spring portion which is configured, in particular, as a preferably arcuate spring tab.

The respective spring portion of the locking spring in this case may be inserted into a relevant locking recess of the mounting portion such that a longitudinal end portion of the spring portion is located on the housing and a central portion of the spring portion is located inside on the mounting portion. In this case, the mounting portion is preferably configured such that the locking spring may be inserted with its respective spring portion inside the housing into the relevant locking recess.

In preferred embodiments of the invention, a relevant locking recess of the mounting portion is a through-recess. In this case, the locking spring is preferably configured such that it may be supported in the locked state in the mounting portion with the two longitudinal end portions thereof on the housing. In embodiments of the invention, in a locked state of the locking spring a blocking device of the locking spring bears in a locked manner in the locking recess against a blocking device in the locking recess. In this case, the blocking device of the locking spring is preferably configured as a blocking tab or a blocking projection and the blocking device of the locking recess is preferably configured as a blocking recess and/or a blocking shoulder.

In embodiments of the invention, the plug connector housing may be designed such that a sealing unit, for example a combined axial/radial seal, may be mounted between the plug connector housing and one side of the housing, in particular an outer face of the housing. Moreover, the plug connector housing may be designed such that a radial seal or a radial seal, configured in particular as a mat seal, is received in the plug connector housing, wherein the radial seal is mounted in the plug connector housing by means of a fixing device preferably configured as a fixing plate.

In embodiments of the invention, the axial seal on the shoulder of the connector may be provided outside the mounting portion, completely encircling the mounting portion. Moreover, the relevant radial seal may be provided inside the plug connector housing, wherein it fluid-seals the relevant electrical line relative to the plug connector housing. The plug connector housing may have a plurality of through-recesses, through which the electrical lines are able to extend. Moreover, the mounting portion may be configured as a plurality of domes which may be inserted through a plurality of through-recesses in the housing; the locking spring is then able to be inserted therein through recesses in the domes, in particular plugged through said recesses.

BRIEF DESCRIPTION OF THE DRAWINGS

The invention is described in more detail hereinafter with reference to exemplary embodiments and referring to the accompanying detailed drawings, in which.

DETAILED DESCRIPTION

Figure 1:
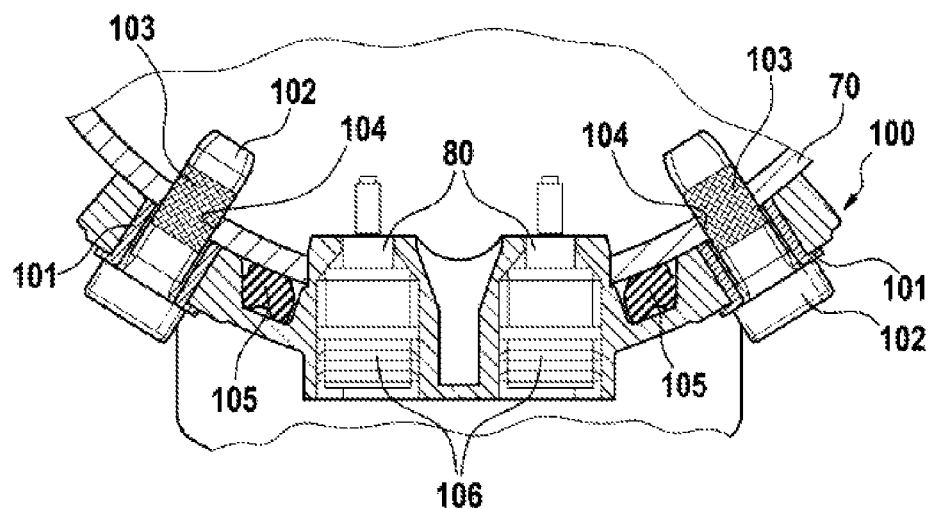
FIG. 1 shows a sectional plan view of a sealing flange according to the prior art on a housing of an electric motor for an electrical supply line or control line of the electric motor.
Figure 2:
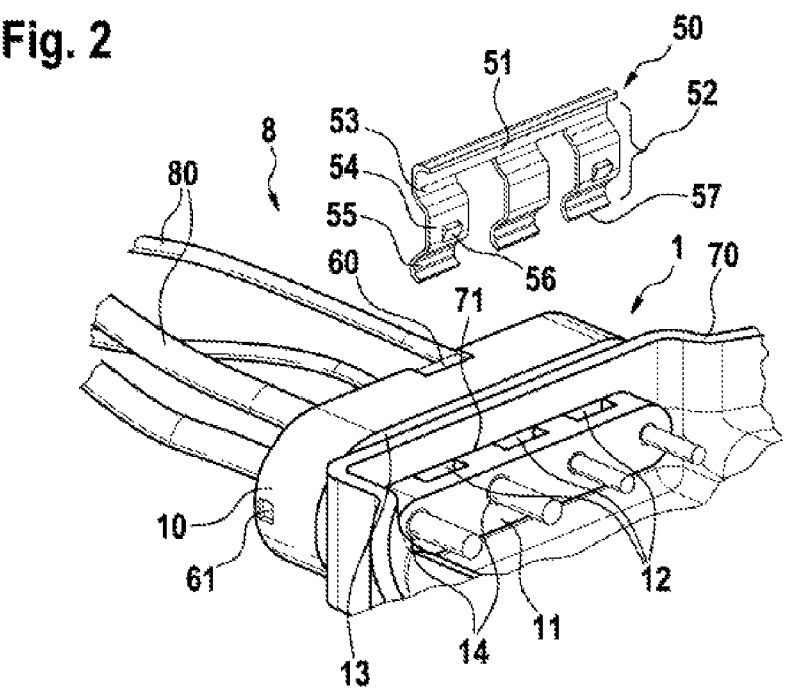
FIG. 2 shows a perspective view from above and the front of a first variant of a fluid-sealing electric motor connector according to the invention, during the mounting thereof on a housing of an electric motor.
Figure 3:
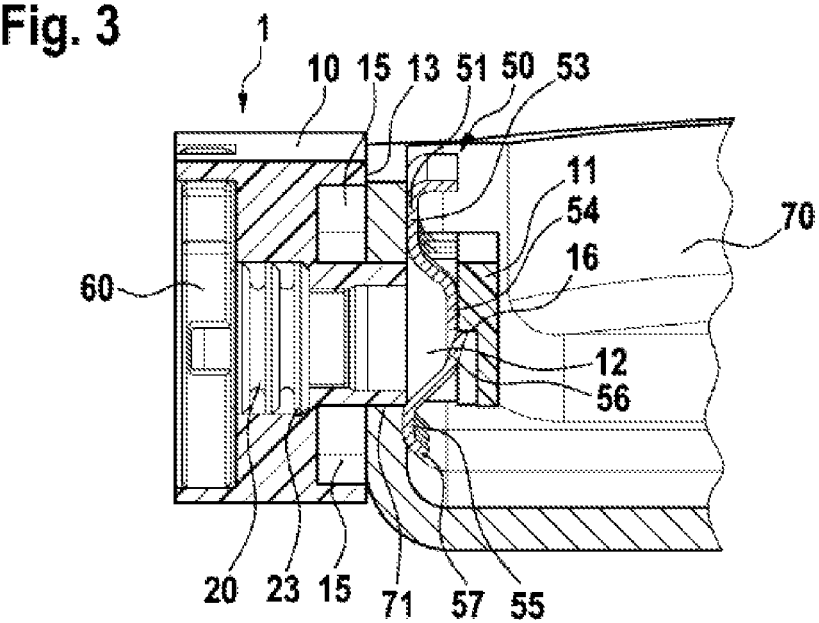
FIG. 3 shows a lateral sectional perspective view of the connector of FIG. 2 in a mounted state in the region of its locking to the electric motor.

Initially with reference to FIGS. 2 to 8 of the drawings, the first variant of the fluid-sealing electric motor connector 1 according to the invention is described below with reference to two embodiments. The connector 1 has a plug connector housing 10 by means of which it may be fastened to a housing 70, for example a pole housing 70 of an electric motor 7. At least one electrical line 80 and/or at least one electrical cable 80 is passed through the connector 1 into the inside of the electric motor, said electrical line and/or cable then being electrically connected to an electrical conductor inside the electric motor 7 (see FIG. 5). The electrical lines 80 provided on the connector 1 together with the connector 1 in this case form a ready-to-use electrical cable 8 and/or cable harness 8.

The plug connector housing 10 is of substantially cuboidal construction with preferably rounded side walls, and on the front face thereof has a mounting portion 11, wherein on the plug connector housing 10 in the transition to the mounting portion 11 thereof, a shoulder 13 is formed by means of which the connector 1 may be located on the housing 70. The mounting portion 11 thus protrudes in such a state—a mounted state of the connector 1 on the housing 70—through a through-recess 71 in the housing 70 inwardly into the housing 70. In this case it is preferred that the connector 1 is locked inside the housing 70, wherein the locking, together with the shoulder 13, clamps a wall of the housing 70 therebetween; however an, optionally additional, external locking of the plug connector housing 10 to the housing 70 may also be used.

Such a locking may, for example, be implemented by means of latching devices, for example latching hooks formed on the mounting portion 11, said latching devices being latched inside the housing 70 on suitable latching devices; this may, for example, be an internal wall of the housing 70 (not shown in the drawings). Moreover, latching devices, for example latching tabs or latching recesses, may be provided or configured on the plug connector housing 10, such that said latching devices are latched with latching devices, for example latching recesses or latching hooks, outside on the housing 70 (also not shown in the drawings). Moreover, the locking is possible by means of a locking spring 50 or securing spring 50 which pulls the shoulder 13 of the plug connector housing 10 against the outer wall of the housing 70, which is described in more detail below.

Figure 4:
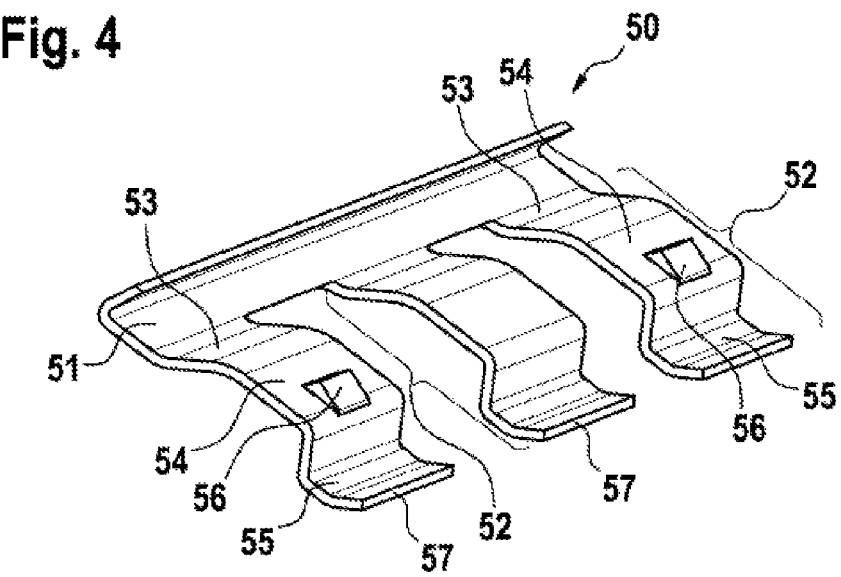
FIG. 4 shows a three-dimensional view of a locking spring for the connector.

Such a locking spring 50, which is preferably made in one piece from the same material and stamped from a metal sheet, is shown in more detail in FIG. 4, wherein the locking spring 50 preferably has three spring portions 52, configured in particular as spring tabs 52, on a web 51. Naturally, there may be any number of spring portions 52, the number thereof only corresponding to the number of locking recesses 12 in the mounting portion 11. One respective spring portion 52 is preferably of arcuate configuration and provides a spring force perpendicular to its planar extent.

The respective spring portion 52 is connected to the web 51 by an attached longitudinal end portion 53, is then lifted up in the direction of one free end 57 in a planar manner from a plane of the web 51 in the direction of its central portion 54, in order to drop back again in the direction of a free longitudinal end portion 55 into the plane of the attached longitudinal end portion 53. The free end 57 of the respective spring portion 52 is in turn lifted up in the same direction as the central portion 54, in order to facilitate the insertion of the locking spring 50.

Preferably, in the central portion 54 of the respective spring portion 52, a blocking device 56 configured in particular as a blocking tab 56 or as a blocking projection 56 is provided, by means of said locking device a relevant spring portion 52 and/or the locking spring 50 being able to be latched in a relevant locking recess 12 in the mounting portion 11, whereby the locking spring 50 is prevented from sliding out from the relevant locking recesses 12. Preferably, only the two outer spring portions 52 have blocking devices 56 formed thereon. A blocking device 56 in this case engages and/or acts in the mounted state of the locking spring 50 in/on the mounting portion 11 in a blocking device 16 preferably formed as a blocking recess 16 and/or preferably formed as a blocking shoulder 16, wherein the blocking device 16 is provided in a relevant locking recess 12 (see FIG. 3).

Figure 5:
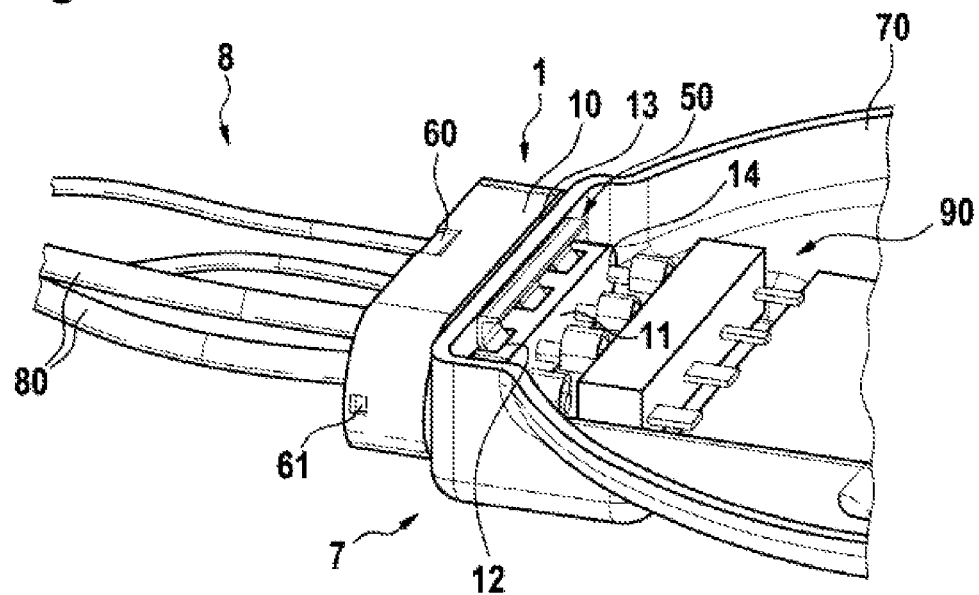
FIG. 5 shows a perspective view of the connector, similar to FIG. 2, which shows the connector in a mounted state, wherein contact is made between the electric motor and electrical lines.

The mounted state of the connector 1 on the housing 70 is also clearly seen in FIG. 5, wherein the locking spring 50 is inserted with each of its spring portions 52 into a corresponding locking recess 12 of the mounting portion 11. In this case, the corresponding locking recesses 12 protrude inwardly into the housing 70. In the mounted state, the relevant two longitudinal end portions 53, 55 of the locking spring 50 bear on the inside against the housing 70, whereas the relevant central portion 54 bears on the inside against the respective locking recess 12, and thus pretensions the mounting portion 11 and thus the plug connector housing 10 in the direction of the inside of the housing 70, i.e. an axial seal 30 is axially loaded (see below). In other words, the relevant central portion 54 of the spring portions 52 bears against an edge of the relevant locking recess 12 directly adjacent to a free end of the mounting portion 11.

Figure 6:
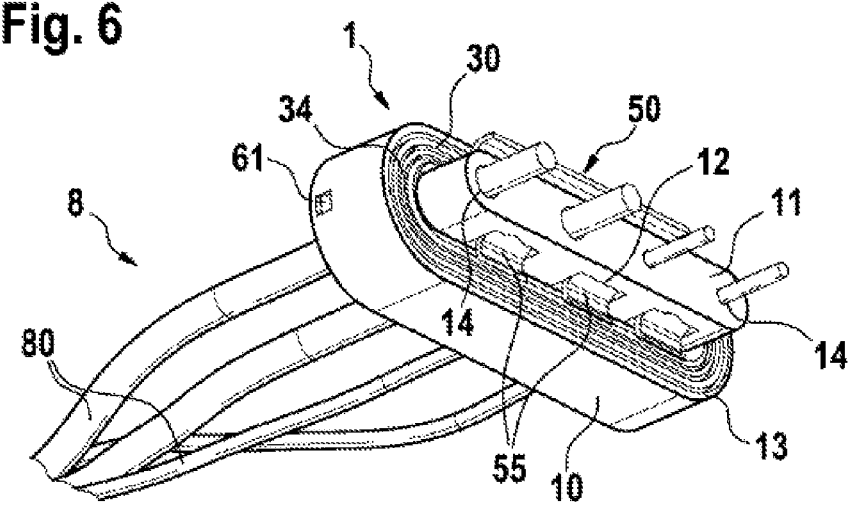
FIG. 6 shows a perspective view from the front and below of the connector in the mounted state, wherein the housing and/or the electric motor have been omitted for the sake of clarity.
Figure 7:
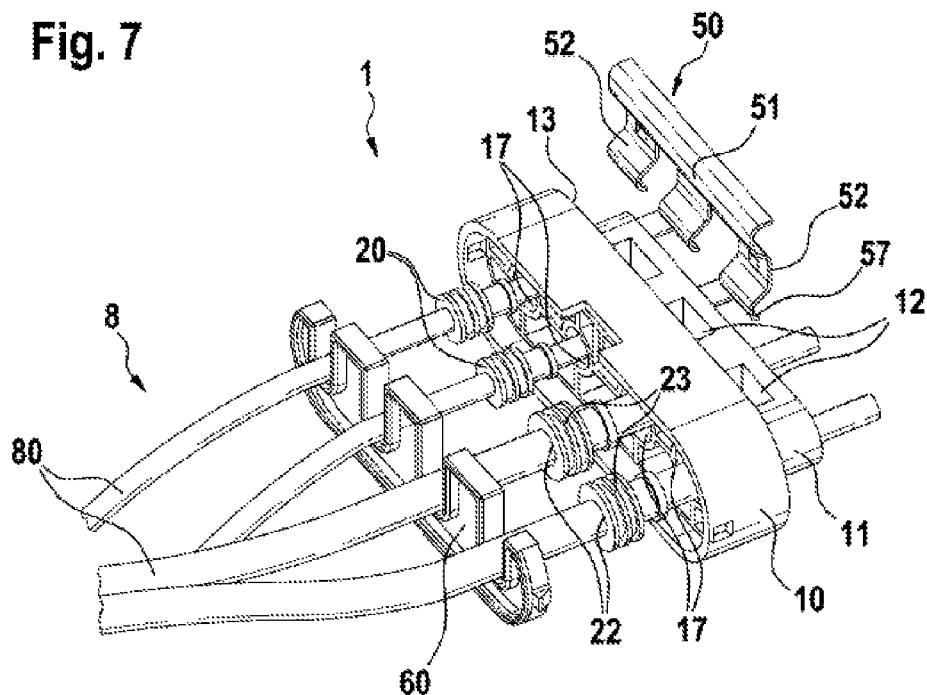
FIG. 7 shows a first embodiment of the first variant of the connector according to the invention in a three-dimensional exploded view from above and the rear.
Figure 8:
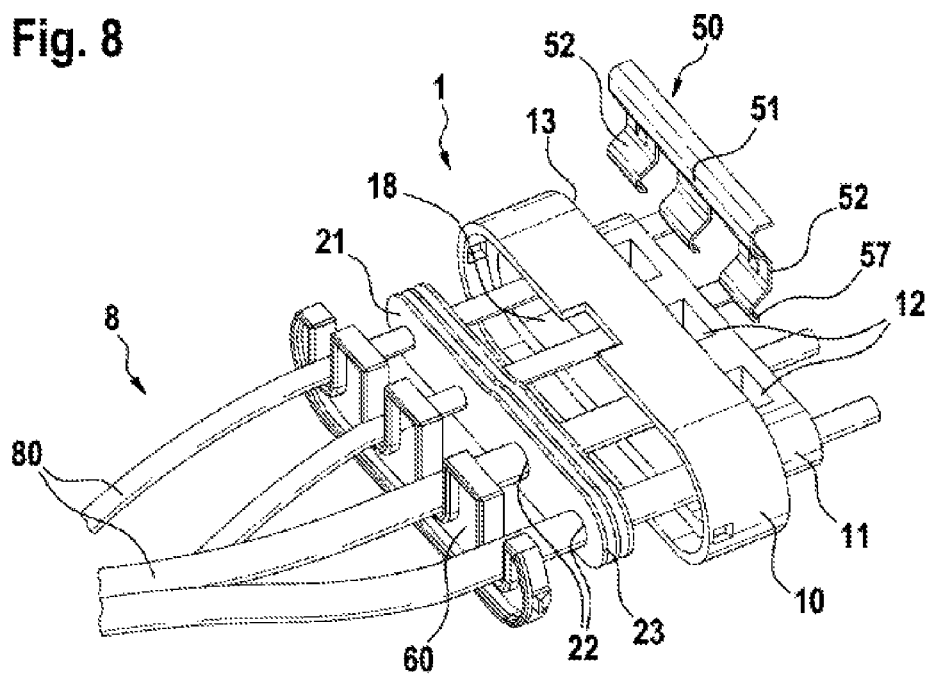
FIG. 8 shows a second embodiment of the first variant of the connector according to the invention, also in a three-dimensional exploded view from above and the rear.
Figure 9:
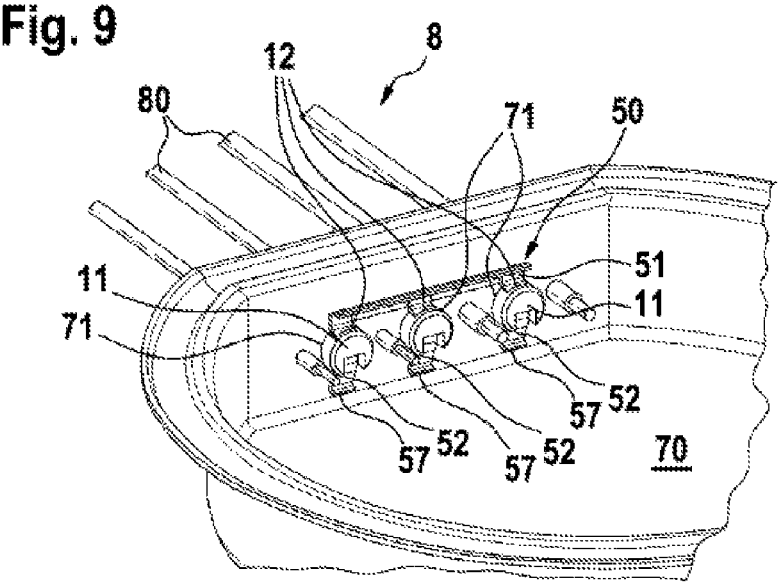
FIG. 9 shows a perspective view from above and the front of a second variant of the fluid-sealing electric motor connector according to the invention in a mounted state on a housing of an electric motor.
Figure 10:
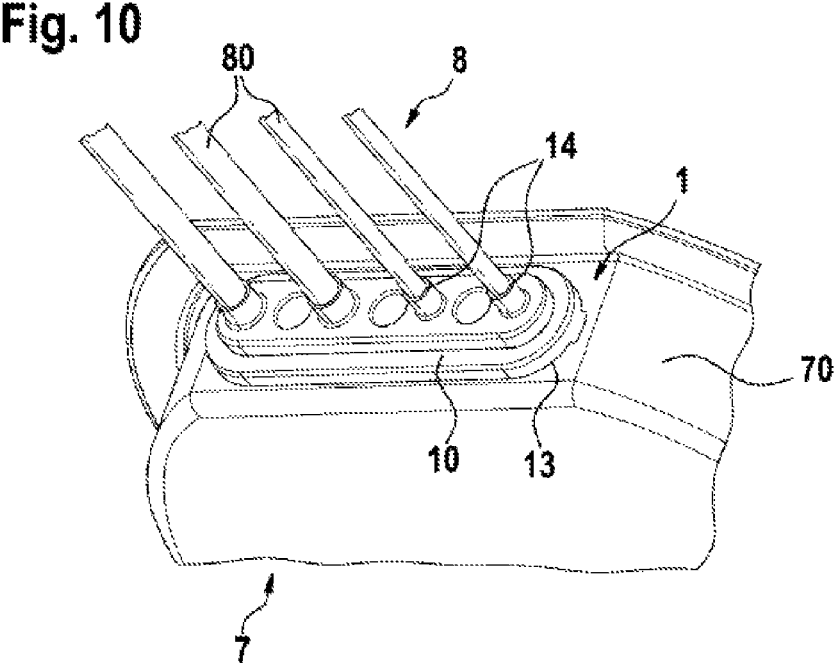
FIG. 10 shows a perspective view from below and the rear of the mounted connector of FIG. 9.
Figure 11:
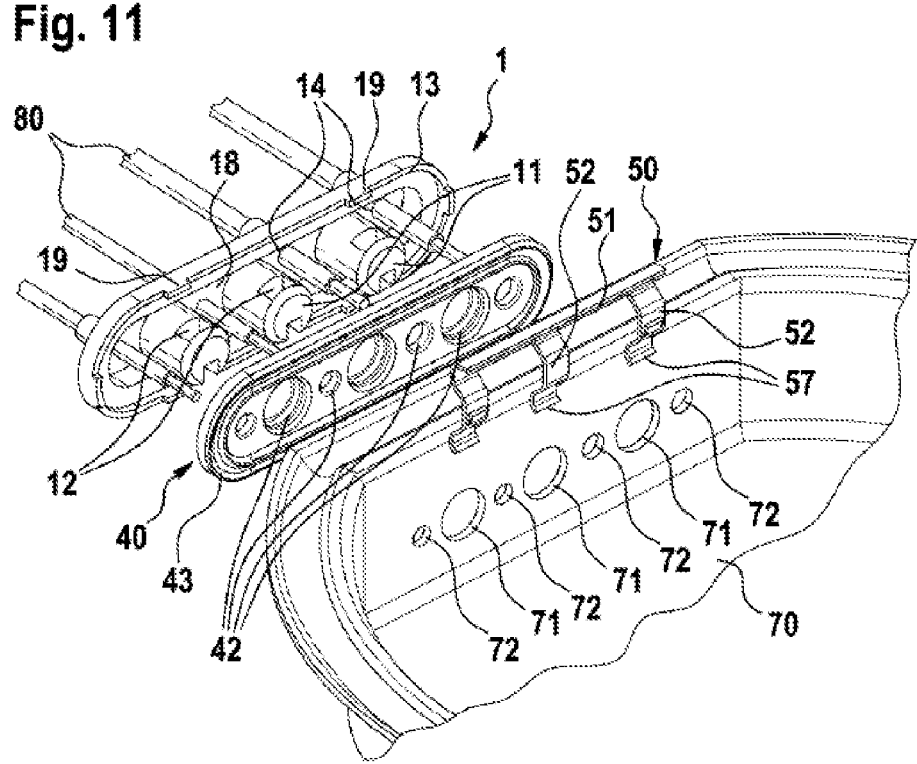
FIG. 11 shows a three-dimensional exploded view from above and the front of the connector during the mounting thereof on the housing of the electric motor.
Figure 12:
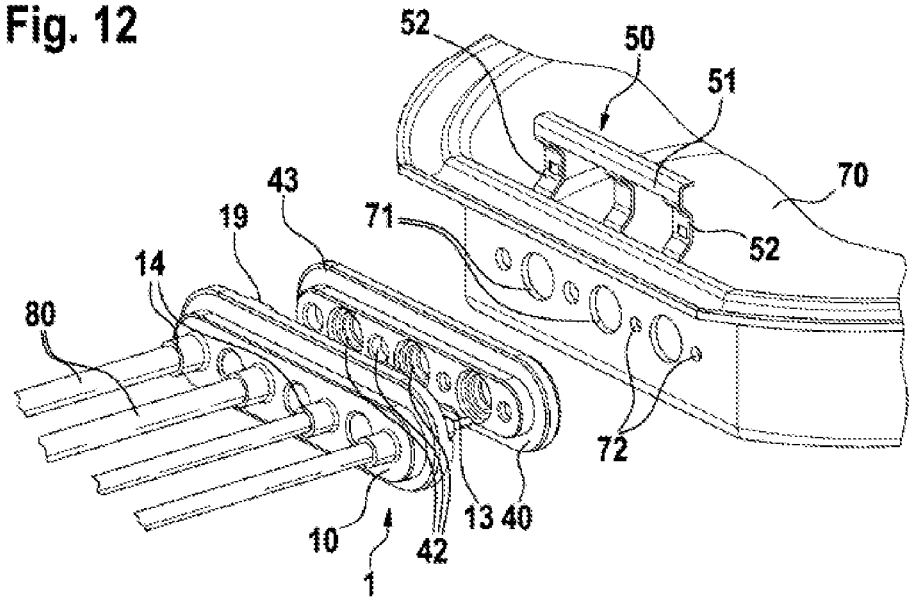
FIG. 12 shows a three-dimensional exploded view from above and the rear of the connector during the mounting thereof on the housing.
Figure 13:
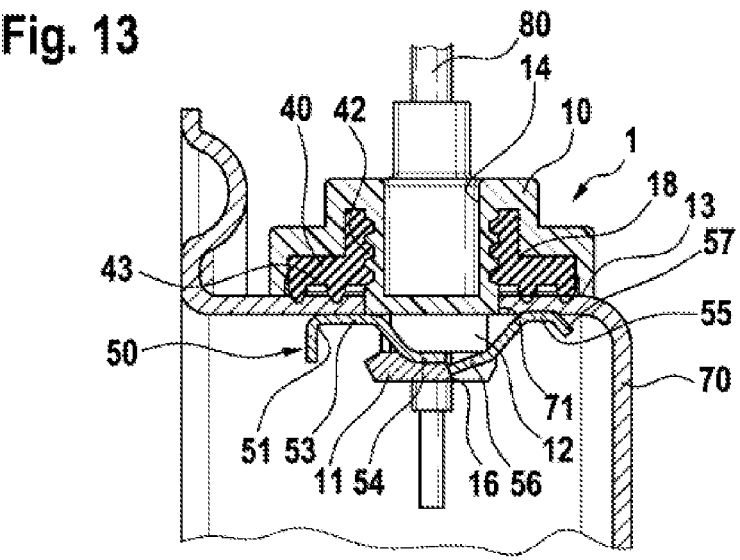
FIG. 13 shows a sectional view through the mounted connector in the region of its locking to the housing.
Figure 14:
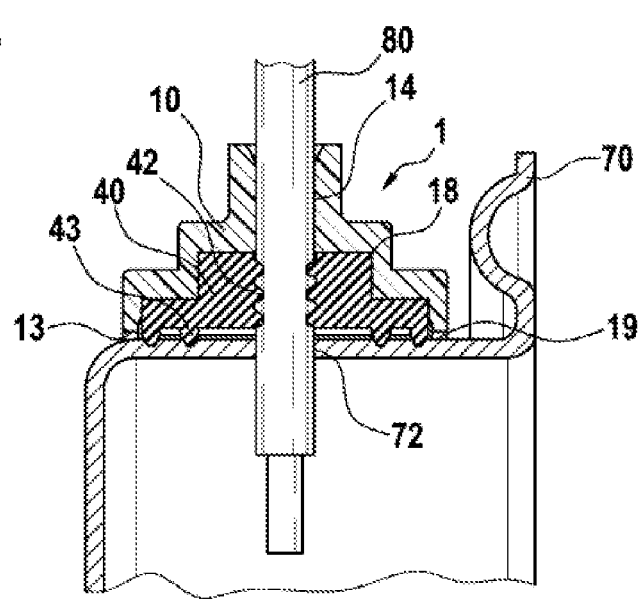
FIG. 14 shows a sectional view similar to FIG. 13 but sectioned in the region of an electrical line passed through the connector.

To fluid-seal the connector 1 relative to the housing 70, the connector 1 preferably has an axial seal 30 in a groove 15 of the plug connector housing 10 (see FIG. 6). In this case, the groove 15 is machined into the shoulder 13 (see FIG. 3) and preferably completely encircles the mounting portion 11 protruding from the shoulder 13. Outside the groove 15, projections 19 (see the second variant of the invention, FIGS. 11 and 12) may be provided on the shoulder 13 which define a maximum axial compression path of the axial seal 30. In the mounted state, the locking spring 50 pulls the axial seal 30 with its sealing portion 34 against an outer face of the housing 70, whereby the plug connector housing 10 is fluid-sealed externally relative to the housing 70.

Moreover, the connector 1 has a radial seal 20, 21 (see FIGS. 7 and 8) which is fluid-sealed by means of an internal sealing portion 22 with regard to a relevant, or the relevant, electrical line 80 and by means of an outer seal portion 23 relative to the plug connector housing 10. In this case, there are two embodiments. In the first embodiment shown in FIG. 7, each electrical line 80 is individually sealed, for which the plug connector housing 10 has one respective individual receiver 17. In the second embodiment of the first variant shown in FIG. 8, a plurality, and in particular all, electrical lines 80 are sealed by a single radial seal 21, preferably configured as a mat seal 21, for which the plug connector housing 10 has a planar, for example rear, receiver 18.

Both the individual radial seals 20 and the mat seal 21 are held in position by a fixing device 60 which may be fastened to the plug connector housing 10, in particular secured by means of a tamper-evident device 61. Moreover, the plug connector housing 10 has through-recesses 14 for the electrical lines 80, wherein the lines 80 may be additionally secured to/in the plug connector housing 10; however it is also possible to pass the lines 80 simply through the plug connector housing 10, without securing said lines to the plug connector housing 10. Inside the housing 70, the lines 80 are able to be connected to electrical connection devices 90, wherein the lines 80 supply the electric motor 7 with electrical power for generating a torque and/or transmit control signals thereto and/or pass signals therefrom.

Moreover, a permissible degree of deformation and also a setting behavior of the sealing lips of the axial seal 30 may be relatively accurately set by the thickness and also the material of the locking spring 50. Moreover, the locking spring 50 compensates for the relaxation of the material of the axial seal 30, so that a fluid-seal is permanently ensured. The locking spring 50 in this case is designed such that it axially holds the plug connector housing 10 securely on the housing 70, even in the case of vibrational stress. In this case, the connector 1 according to the invention may be used, for example, in electronically commutated (EC) and DC motors.

With reference to FIGS. 9 to 14 of the drawings, the second variant of the fluid-sealing electric motor connector 1 according to the invention is described hereinafter with reference to one embodiment. In this case, details are only provided about features which differ from the first variant of the invention. In other words, features of the first variant may be transferred to the second variant of the invention; it is also possible to transfer the features of the second variant to the first variant of the invention. According to the second variant, the two separate components of the first variant which seal in a radial manner (axial seal 30) and in an axial manner (radial seal 20, 21) are combined into one sealing unit 40, which is a combined axial/radial seal 40 and may take the form of a mat seal 40. An internal sealing portion 42 in this case takes on the function of the above radial seal 20 and an outer sealing portion 43 the function of the above axial seal 30.

In addition to lower material costs for the sealing unit 40, the mounting time is also reduced, without the sealing behavior of the connector 1 being impaired. Relative to the above embodiment, the mounting portion 11 is no longer substantially cuboidal but configured as one, or a plurality of, preferably cylindrical dome(s) 11. In this case, for the mounting of the connector 1 to the housing 70, a longitudinal end portion of one respective dome 11 is moved forward through a separate through-recess 71 in the housing 70.

Moreover, the housing 70 has through-recesses 72 for the electrical lines 80 adjacent to the through-recesses 71 for the domes 11. Three cylindrical domes 11 are preferably formed on the plug connector housing 10 between four electrical lines 80. Similar to the first variant of the invention, for locking the plug connector housing 10 to the housing 70, the domes 11 have on their respective free longitudinal end portion a locking recess 12 into which the locking spring 50 may be inserted in a locked manner; which takes place in a similar manner to the first variant of the invention.

The sealing unit 40 is received in a front receiver 18 of the plug connector housing 10 and/or may be received during mounting of the connector 1 on the housing 70, wherein the sealing unit 40 is clamped between the housing 70 and the plug connector housing 10. In this case, the outer sealing portion 43 bears against the housing 70 and seals the plug connector housing 10 relative to the housing 70. The inner sealing portions 42 seal the electrical lines 80 and the domes 11 relative to the housing 70. Moreover, the domes 11 are in turn fluid-sealed, as the domes 11 are sealed on the inside behind the inserted locking spring 50 (see FIG. 13) so that by means of the partially hollow domes 11 no fluid is able to penetrate the inside of the housing 70. In this case, the domes 11 serve, on the one hand, for fastening the connector 1 to the housing 70 and, on the other hand, for saving material of the sealing unit 30.

The sealing unit 40 is preferably designed (see FIGS. 13 and 14) such that the inner sealing portion 42 is reduced relative to the outer sealing portion 43, whereby sealing material is saved. In other words, the sealing unit 40 in the region of the through-recesses 71, 72 for the domes 11 and the electrical lines 80 is thicker in cross section than at other points, in particular a periphery on which the outer sealing portion 43 of the sealing unit 40 is preferably located. Preferably, the sealing unit 40 is configured in one piece from the same material as its sealing portions 42, 43; but it is possible to provide the sealing portions 42, 43 on a base body of the sealing unit 40, in particular to bond said sealing portions thereto, in order to save further sealing material, as in such a case only the sealing portions 42, 43 are preferably formed from sealing material.

Moreover, in both variants of the invention it is possible to form a cover or a further housing part of the electric motor 7 (neither shown in the drawings) which closes, for example, the housing 70 in its mounted state and/or in the mounted state thereof on the housing 70, in a portion adjacent to the locking spring 50, such that for example a projection holds the locking spring 50 in its mounted position. This may also be transmitted to the housing 70, which on the inside on a corresponding region has a projection or a recess which then holds the locking spring 50 in its mounted position. In the case of a recess in the housing 70, the locking spring 50 then engages with a projection therein.

What is claimed is:

1. A fluid-sealing electric motor connector for a housing (70) of an electric motor (7), the connector comprising a plug connector housing (10) configured to be plugged onto the housing (70), by means of which at least one electrical line (80) is configured to be connected to the electric motor (7) so as to be fluid-sealed relative to the electric motor (7), wherein the plug connector housing (10) includes a sealing surface configured to abut an outside surface of the housing (70), and wherein the plug connector housing (10) is configured to be fastened to the housing (70) by means of a detachable locking spring (50) positionable within the motor housing and engageable with an inside surface of the motor housing.

2. The fluid-sealing electric motor connector as claimed in claim 1, characterized in that the plug connector housing (10) has a radial seal (20, 21) and an axial seal (30) or a sealing unit (40) which ensures an axial and radial fluid-seal of at least one of the electrical line (80) and the electric motor connector relative to the housing (70).

3. The fluid-sealing electric motor connector as claimed in claim 2, characterized in that the relevant radial seal (20, 21) is provided inside the plug connector housing (10) and fluid-seals the relevant electrical line (80) relative to the plug connector housing (10).

4. The fluid-sealing electric motor connector as claimed in claim 1, characterized in that the plug connector housing (10) has a mounting portion (11), by means of which the electric motor connector is configured to be fastened to the housing (70) of the electric motor (7), wherein the mounting portion (11) protrudes through a recess (71) in the housing (70) inwardly into the housing (70) and is configured such that the electric motor connector is configured to be blocked inside the housing (70) or the mounting portion is configured on the plug connector housing (10) such that the electric motor connector is configured to be blocked outside the housing (70).

5. The fluid-sealing electric motor connector as claimed in claim 4, characterized in that the mounting portion (11) has a locking recess (12) into which the locking spring (50) is configured to be inserted for mounting the electric motor connector on the housing (70) such that a wall of the housing (70) is configured to be clamped between the locking spring (50) and a shoulder (13) of the plug connector housing (10).

6. The fluid-sealing electric motor connector as claimed in claim 5, characterized in that the locking spring (50) has at least one spring portion (52), and the respective spring portion (52) is configured to be inserted into a relevant locking recess (12) of the mounting portion (11), such that a longitudinal end portion (53, 55) of the spring portion (52) is located on the housing (70) and a central portion (54) of the spring portion (52) is located inside on the mounting portion (11).

7. The fluid-sealing electric motor connector as claimed in claim 5, characterized in that in a locked state of the locking spring (50) a blocking device (56) of the locking spring (50) bears in a locked manner in the locking recess (12) against a blocking device (16) of the locking recess (12).

8. The fluid-sealing electric motor connector as claimed in claim 7, characterized in that the relevant locking recess (12) of the mounting portion (11) is a through-recess (12), wherein the locking spring (50) is configured to be supported in the locked state in the mounting portion (11) with the longitudinal end portions (53, 55) thereof on the housing (7).

9. The fluid-sealing electric motor connector as claimed in claim 5, characterized in that an axial seal (30) on the shoulder (13) of the electric motor connector is provided outside the mounting portion (11) completely encircling the mounting portion (11).

10. The fluid-sealing electric motor connector as claimed in claim 5, characterized in that the locking spring (50) has at least one spring portion (52) which is configured as an arcuate spring tab (52), and the respective spring portion (52) is configured to be inserted into a relevant locking recess (12) of the mounting portion (11), such that a longitudinal end portion (53, 55) of the spring portion (52) is located on the housing (70) and a central portion (54) of the spring portion (52) is located inside on the mounting portion (11), wherein the mounting portion (11) is configured such that the locking spring (50) may be inserted with its respective spring portion (52) inside the housing (70) into the relevant locking recess (12).

11. The fluid-sealing electric motor connector as claimed in claim 5, characterized in that in a locked state of the locking spring (50) a blocking device (56) of the locking spring (50)

bears in a locked manner in the locking recess (12) against a blocking device (16) of the locking recess (12), wherein the blocking device (56) of the locking spring (50) is a blocking tab (56) or a blocking projection (56) and the blocking device (16) of the locking recess (12) is at least one of a blocking recess (16) and a blocking shoulder (16).

12. The fluid-sealing electric motor connector as claimed in claim 4, characterized in that the mounting portion (11) has a locking recess (12) formed as a through-recess (12), into which the locking spring (50) is configured to be inserted for mounting the electric motor connector on the housing (70) such that a wall of the housing (70) is configured to be clamped between the locking spring (50) and a shoulder (13) of the plug connector housing (10).

13. The fluid-sealing electric motor connector as claimed in claim 4, characterized in that the mounting portion (11) comprises a plurality of domes (11) inserted through a plurality of through-recesses (71) in the housing (70).

14. A motor having a fluid-sealing electric motor connector as claimed in claim 1.

15. The fluid-sealing electric motor connector as claimed in claim 1, characterized in that the plug connector housing (10) has a radial seal (20, 21) and an axial seal (30) or a sealing unit (40) which is made in one piece from the same material, which ensures an axial and radial fluid-seal of at least one of the electrical line (80) and the electric motor connector relative to the housing (70).

16. The fluid-sealing electric motor connector as claimed in claim 1, characterized in that the plug connector housing (10) is designed such that a sealing unit (40) is configured to be mounted between the plug connector housing (10) and an outer face of the housing (70), or at least one radial seal configured as a mat seal (21), is received in the plug connector housing (10), wherein the at least one radial seal is mounted in the plug connector housing (10) by means of a fixing device (60) configured as a fixing plate (60).

17. The fluid-sealing electric motor connector as claimed in claim 1, characterized in that the plug connector housing (10) has a plurality of through-recesses (14), through which the electrical lines (80) are configured to extend.

18. A ready-to-use electrical cable (8) for a motor (7), the electrical cable (8) having a fluid-sealing electric motor connector as claimed in claim 1.

19. A fluid-sealing electric motor connector for a housing (70) of an electric motor (7), the connector comprising a plug connector housing (10) configured to be plugged onto the housing (70), by means of which at least one electrical line (80) is configured to be connected to the electric motor (7) so as to be fluid-sealed relative to the electric motor (7), wherein the plug connector housing (10) is configured to be fastened to the housing (70) by means of a locking spring (50) positionable within the motor housing and engageable with an inside surface of the motor housing, and wherein the plug connector housing (10) is designed such that a sealing unit (40) is configured to be mounted between the plug connector housing (10) and one side of the housing (70), or at least one radial seal is received in the plug connector housing (10), wherein the at least one radial seal is mounted in the plug connector housing (10) by means of a fixing device (60).

20. A fluid-sealing electric motor connector for a housing (70) of an electric motor (7), the connector comprising a plug connector housing (10) configured to be plugged onto the housing (70), by means of which at least one electrical line (80) is configured to be connected to the electric motor (7) so as to be fluid-sealed relative to the electric motor (7), wherein the plug connector housing (10) is configured to be fastened to the housing (70) by means of a locking spring (50) or a latch mechanism, and wherein the plug connector housing (10) has a mounting portion (11), by means of which the electric motor connector is configured to be fastened to the housing (70) of the electric motor (7), wherein the mounting portion (11) protrudes through a recess (71) in the housing (70) inwardly into the housing (70) and is configured such that the electric motor connector is configured to be blocked inside the housing (70) or the mounting portion is configured on the plug connector housing (10) such that the electric motor connector is configured to be blocked outside the housing (70).

* * * * *